United States Patent [19]

Tanaka

[11] Patent Number: 5,731,764
[45] Date of Patent: Mar. 24, 1998

[54] POWER CONTROL SYSTEM FOR CONNECTING AND VERIFYING SLAVE CONNECTIONS

[75] Inventor: Shigeo Tanaka, Tokyo, Japan

[73] Assignee: Sony Corporation, Tokyo, Japan

[21] Appl. No.: 890,281

[22] Filed: Jul. 9, 1997

Related U.S. Application Data

[63] Continuation of Ser. No. 524,772, Sep. 7, 1995, abandoned, which is a continuation of Ser. No. 247,292, May 23, 1994, abandoned, which is a division of Ser. No. 133,838, Oct. 12, 1993, Pat. No. 5,402,183.

[30] Foreign Application Priority Data

Oct. 13, 1992 [JP] Japan .................................. 4-300387
Feb. 12, 1993 [JP] Japan .................................. 5-047396

[51] Int. Cl.[6] ...................................... G05B 19/02
[52] U.S. Cl. .................. 340/825.07; 340/825.24; 340/825.25; 364/143; 348/5.5
[58] Field of Search .................. 340/825.07, 825.25, 340/825.24, 825.06; 364/140, 143, 138, 141; 348/5.5

[56] References Cited

U.S. PATENT DOCUMENTS

| 4,274,082 | 6/1981 | Litz et al. ............... 340/825.62 |
|---|---|---|
| 4,600,948 | 7/1986 | Dangschat ............... 348/706 |
| 4,808,992 | 2/1989 | Beyers, Jr. et al. .......... 340/825.54 |
| 4,855,730 | 8/1989 | Venners et al. ........... 340/825.24 |
| 4,903,130 | 2/1990 | Kitagawa et al. ............ 348/706 |
| 4,907,085 | 3/1990 | Bingham ................. 358/181 |
| 5,097,249 | 3/1992 | Yamamoto .............. 340/825.72 |
| 5,153,580 | 10/1992 | Pollack ................. 340/825.25 |
| 5,182,552 | 1/1993 | Paynting ............... 340/825.69 |
| 5,204,662 | 4/1993 | Oda et al. ................. 340/825 |
| 5,255,180 | 10/1993 | Shinoda et al. ........... 340/825.69 |

FOREIGN PATENT DOCUMENTS

| 0510739 | 3/1991 | European Pat. Off. ...... H04B 1/20 |
|---|---|---|
| 2204754 | 11/1988 | United Kingdom ........ G11B 31/00 |

*Primary Examiner*—Michael Horabik
*Assistant Examiner*—William H. Wilson, Jr.
*Attorney, Agent, or Firm*—Jay H. Maioli

[57] ABSTRACT

A power control system which causes a first slave apparatus to be disconnected from a master apparatus and a second slave apparatus to be connected to the master apparatus, by command from a user; and causes the power to be turned off to the first apparatus after disconnection—but does not disconnect the first apparatus before verifying that it is in fact already connected to the master apparatus.

2 Claims, 8 Drawing Sheets

FIG. 9
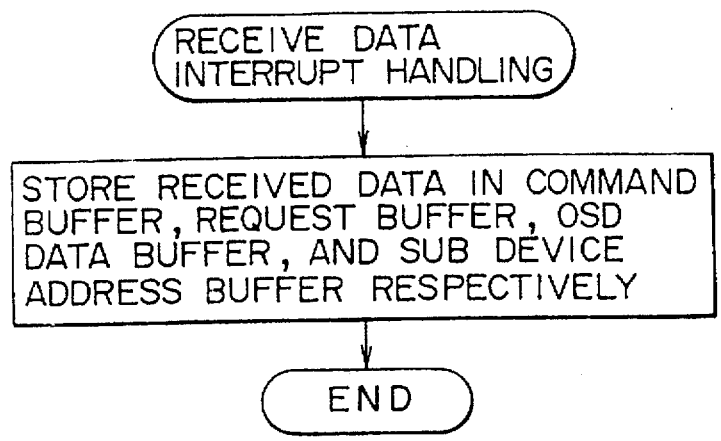
FIG. 10
| SOURCE DEVICE ADDRESS | DESTINATION DEVICE ADDRESS | CONTROL BIT | OPERATION CODE | OPERAND (S) |
|---|---|---|---|---|
FIG. 11
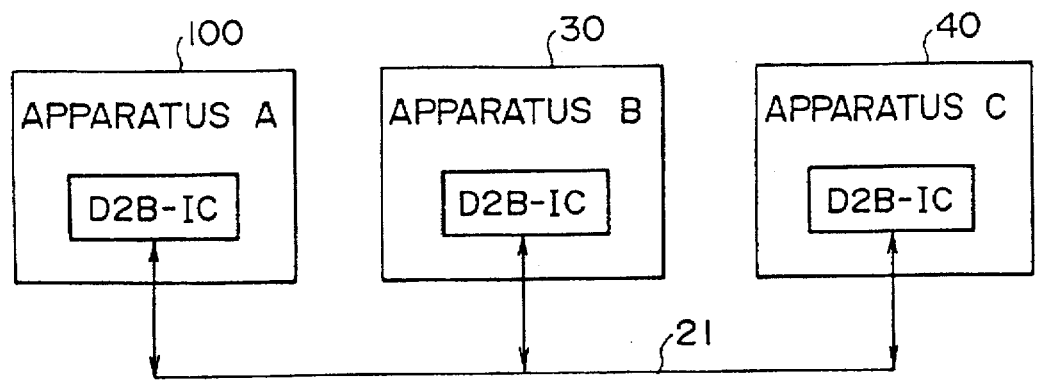

POWER CONTROL SYSTEM FOR CONNECTING AND VERIFYING SLAVE CONNECTIONS

This is a continuation of application Ser. No. 08/524,772 filed Sep. 7, 1995 now abandoned, which is a Continuation of Ser. No. 08/247,292 filed May 23, 1994 now abandoned, which is a Divisional of Ser. No. 08/133,838 filed Oct. 12, 1993 now U.S. Pat. No. 5,402,183.

BACKGROUND OF THE INVENTION

1. Field of the Invention

The present invention relates to a power control apparatus and an unlocking apparatus suitably used for an audio/video (AV) system or the like.

2. Description of the Prior Art

It is known that a plurality of AV apparatuses such as a video tape recorder (VTR) and a laser disc player (LDP) are connected to an AV center (that is, a television) for example and each of the AV apparatuses turns off its power when it is out of use for a certain period of time.

It is also known that, in an D2B (abbreviation for Domestic Digital Bus) bus system, during communication from a master apparatus to a slave apparatus, the master apparatus issues a locking instruction to the slave apparatus to lock it against an interrupt from another master apparatus; the slave apparatus thus locked rejects any interrupt from another master apparatus until unlocked by the locking master apparatus. However, if no unlocking instruction is issued from the master apparatus to the slave apparatus due to an operation error or a timing error for example, the slave apparatus is left locked, and is unable to accept an instruction from another master apparatus. To avoid such a problem, a conventional method is used in which a slave apparatus, upon reception of a locking instruction from a master apparatus, sets its lock timer and monitors a timer value in a main routine. If no data comes after a certain period of time, the slave apparatus resets a locking flag to get out of a locked state.

However, if each of the apparatuses connected to the AV center turns off its power, it poses the risk of turning off a power to an AV apparatus which is necessary for the AV center.

It is known that processing of the conventional D2B bus system is divided into receive interrupt processing and main processing. In the main processing, bus data received by the receive interrupt processing is sorted to be processed. For example, if a connection command is to be sent from this apparatus to a lower-layer apparatus as instructed by a command received by the receive interrupt processing in the main processing, processing for transmission to the D2B bus must be performed at the same time. Further, a packet-to-packet send wait time at sending must be controlled and inner bus communication processing must be performed at the same time. These processing operations are looped in the main routine and are controlled by corresponding processing flags and timer flags. Consequently, in the conventional method, performing the above-mentioned processing operations including the locking timer monitoring in the main routine requires checking each other's progress, making a program totally complicated and consuming a lot of time for program debugging and maintenance.

OBJECTS AND SUMMARY OF THE INVENTION

It is therefore a first object of the present invention to provide a power control apparatus that turns off only the power to those apparatus connected to an AV center which are not required by AV center for the time being.

It is a second object of the present invention to provide an unlocking apparatus that takes a slave apparatus from a locked state by means of a simple program.

BRIEF DESCRIPTION OF THE DRAWINGS

The above and other objects, features and advantages of the present invention will become more apparent from the following description taken in connection with the accompanying drawings, in which:

FIG. 9 is a flowchart describing an example of receive data interrupt processing of the embodiment shown in FIG. 3;

FIG. 10 is a diagram illustrating a constitution of packet data used in the embodiment shown in FIG. 3; and FIG. 11 is a block diagram illustrating a plurality of AV apparatus connected via a D2B bus for the purpose of describing locking and unlocking operations.

DESCRIPTION OF THE PREFERRED EMBODIMENTS

Figure 1:
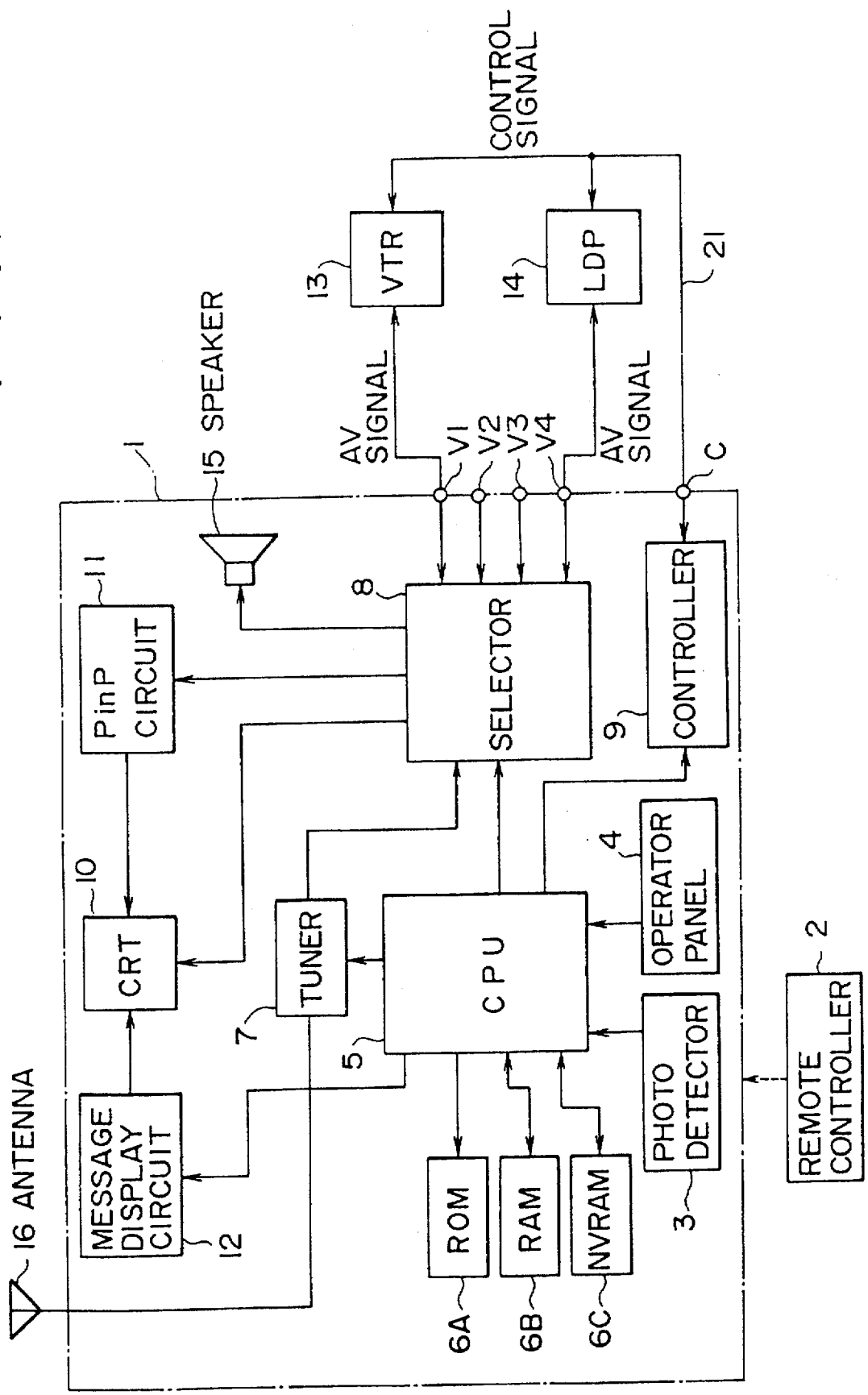
FIG. 1 is a block diagram illustrating one preferred embodiment of a power control apparatus according to the invention.

FIG. 1 shows an example of an AV system which uses a control program according to this invention. In the figure, a remote controller 2 has a power switch for turning on/off a power to an AV center, or a television 1, a channel select button, and a sound volume adjusting switch for adjusting a sound volume of a speaker 15. The remote controller 2 also has a select switch for selecting an AV signal coming from a tuner 7 or one of the AV signals entered via external AV input/output terminals, or plugs V1, V2, V3 and V4 (in the example of FIG. 1, a VTR 13 is connected to the plug V1 and an LDP 14 is connected to the plug V4) to be displayed on a cathode ray tube (CRT) 10 and outputted from the speaker 15. In addition, the remote controller 2 has a control switch for controlling AV apparatuses connected to the plugs V1 through V4. The remote controller 2 emits a light or an infrared radiation from an incorporated light emitting diode when one of the above-mentioned switches is operated.

A photo detector 3 converts the received light or infrared radiation into an electrical signal to send it to a central processing unit (CPU) 5. An operator panel 4 has the same switches as provided on the remote controller 2 and is operated to turn on/off the power to the AV center 1, select a channel, or control the AV apparatuses connected to the plugs V1 through V4.

When the remote controller 2 or the operator panel 4 is operated, the CPU 5 controls the sound volume of the speaker 15, the tuner 7, a selector 8, a controller 9, and a message display circuit 12. A read-only memory (ROM) 6A stores a program and data which are necessary for the CPU 5 to operate. A random access memory (RAM) 6B stores data obtained as a result of processing by the CPU 5. A non-volatile random access memory (NVRAM) 6C stores data that need to be stored even after the power to the AV center is turned off. The control program according to the invention is stored in the ROM 6A. The program may also be stored in the NVRAM 6C.

The sound volume of the speaker 15 is controlled by the CPU 5. When the roll, me adjusting switch of the remote controller 2 or the operator panel 4 is operated, the CPU 5 controls the sound volume to be output from the speaker 15 accordingly. The tuner 7 selects a desired frequency band (a channel) from a radio signal fed from an antenna 16 to generate an AV signal. The generated AV signal is fed to the CRT 10 and the speaker 15 via the selector 8.

The controller 9 is connected, via a control signal input/output terminal C and a control line 21 consisting of a D2B bus for example, to the AV apparatuses such as the VTR 13 and LDP 14 connected to the plugs V1 through V4 to control a power on/off operation of the connected AV apparatuses and a video and audio signal reproducing operation.

The selector 8, controlled by the CPU 5, selects the AV signal coming from the tuner and one of the AV signals coming from the AV apparatuses such as the VTR 13 and the LDP 14 via the plugs V1 through V4 to feed a video signal to the CRT 10 and, via an amplifier, not shown, an audio signal to the speaker 15. Further, the selector 8 selects one of video signals coming from the AV apparatuses such as the VTR 13 and the LDP 14 controlled by the controller 9 to send the selected video signal to a picture-in-picture (PinP) circuit 11. The PinP circuit 11 converts the video signal coming from the selector 8 into a PinP video signal. That is, the PinP circuit 11 converts the video signal coming from the selector 8 such that an image corresponding to the video signal is displayed in a predetermined area (a main picture or a sub picture) of a screen of the CRT 10.

The message display circuit 12, controlled by the CPU 5, outputs character data for displaying a predetermined message as a menu in a predetermined area on the screen of the CRT 10 when performing initialization for determining (or recognizing) the AV apparatuses connected to the plugs V1 through V4.

The CRT 10 displays an image corresponding to a video signal coming from the selector 8. At the same time, the CRT 10 displays an image and a message character string corresponding to a video signal and character data coming from the PinP circuit 11 and the message display circuit 12 respectively in a PinP screen and a message display section on the screen of the CRT.

Figure 2:
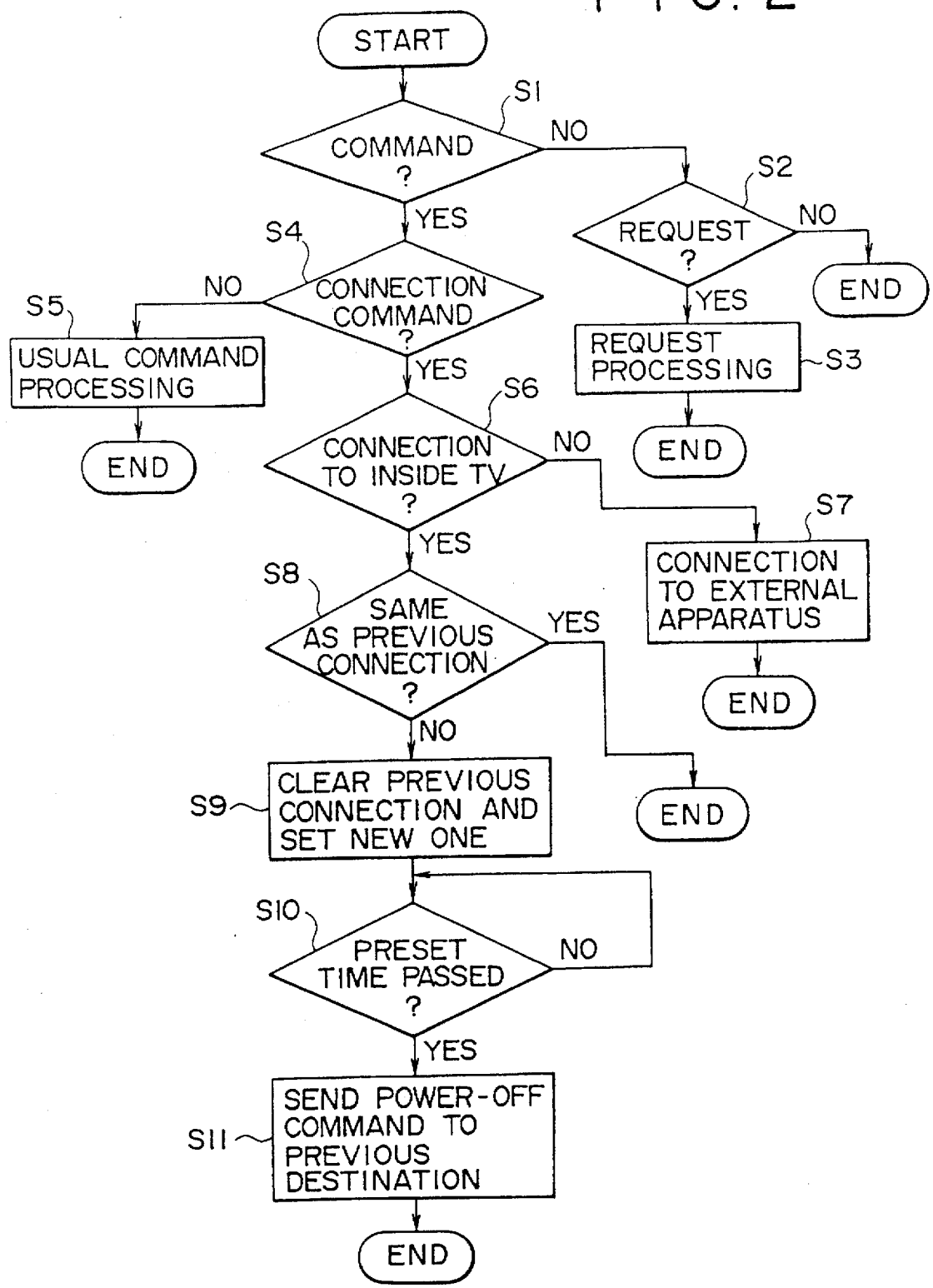
FIG. 2 is a flowchart describing an example of an operation of the embodiment of FIG. 1.

FIG. 2 shows an example of an operation of the embodiment of FIG. 1. When a control signal is fed to the controller 9 from the VTR 13 or the LDP 14 via the control line 21, the CPU 5 determines whether the control signal is a command (step S1 of FIG. 2); if the control signal is not a command, the CPU 5 determines whether it is a request (step S2). If it is found to be a request, the CPU 5 performs request processing (step S3).

If the control signal is a command (YES of step S1), the CPU 5 determines if the command is a connection command. If the command is not a connection command, the CPU 5 performs usual command processing (step S5). If the command is a connection command, the CPU 5 determines whether the connection is internal to the AV center or the television 1 (step S6); otherwise, the CPU 5 performs processing for connection to external equipment (step S7).

If the connection command is for connection internal to the AV center or the television 1 (YES of step S6), the CPU 5 determines whether the connection is the same as a previous internal connection (step S8). If not, the CPU 5 controls the selector 8 to clear the previous internal connection and set the new connection (step S9). When a time set on a timer has passed (YES of step 10), the CPU 5 sends a power-off command to a previously connected AV apparatus (the VTR1 or the LDP 14) via the controller 9 and the control line 21.

Accordingly, if a play command is sent from the LDP 14 to the CPU 5 via the control line 21 and the controller 9 when a video signal from the VTR 13 is being displayed by executing a play command coming from the VTR 13 by way of example, the CPU 5 controls the selector 8 so that a video signal from the LDP 14 rather than a video signal from the VTR 13 is fed to the CRT 10 because the play command sent to the CPU 5 is a connection change command. At the same time, when a preset time has passed, the CPU 5 sends a power-off command to the VTR 13 via the control line 21 to turn off the power to the VTR 13.

Thus, any apparatus (the VTR 13 in the above-mentioned example) that is not needed by the AV center or television 1 can be powered off.

It will be apparent that, although the apparatus not supplying a video signal to the television 1 is powered off in the above-mentioned example, there is another arrangement in which a VTR not fed with a video signal from the tuner 7 is powered off when the television 1 is connected to a plurality of VTR units selectively supplied with a video signal from the tuner 7 via the selector 8. That is, an AV apparatus not using a signal coming from inside the television 1 or not sending a signal to the inside of the television 1 can be powered off.

It will be also apparent that, although an apparatus whose connection is cleared when a preset time has passed after detection of a connection change is powered off in the above-mentioned example, an apparatus whose connection is cleared upon detection of a connection change can be powered off.

Although a connection path is not altered, the AV center 1 does not know an apparatus whose connection has been cleared. This problem can be solved by providing each of the apparatuses connected to the AV center 1 with a capability of powering off itself after a certain time in combination with the above-mentioned embodiment.

In the above-mentioned embodiment, the CPU both detects a connection change and instructs a power-off operation to an apparatus whose connection has been cleared. Alternatively, connection change detecting means for detecting a change of connection with a plurality of apparatuses and power-off instructing means for instructing a power-off operation to an apparatus whose connection has been cleared by the connection change can be implemented by separate hardware units.

It will be apparent that this invention is applicable to other various electronic equipment units than AV apparatuses shown in the above-mentioned embodiment.

Figure 3:
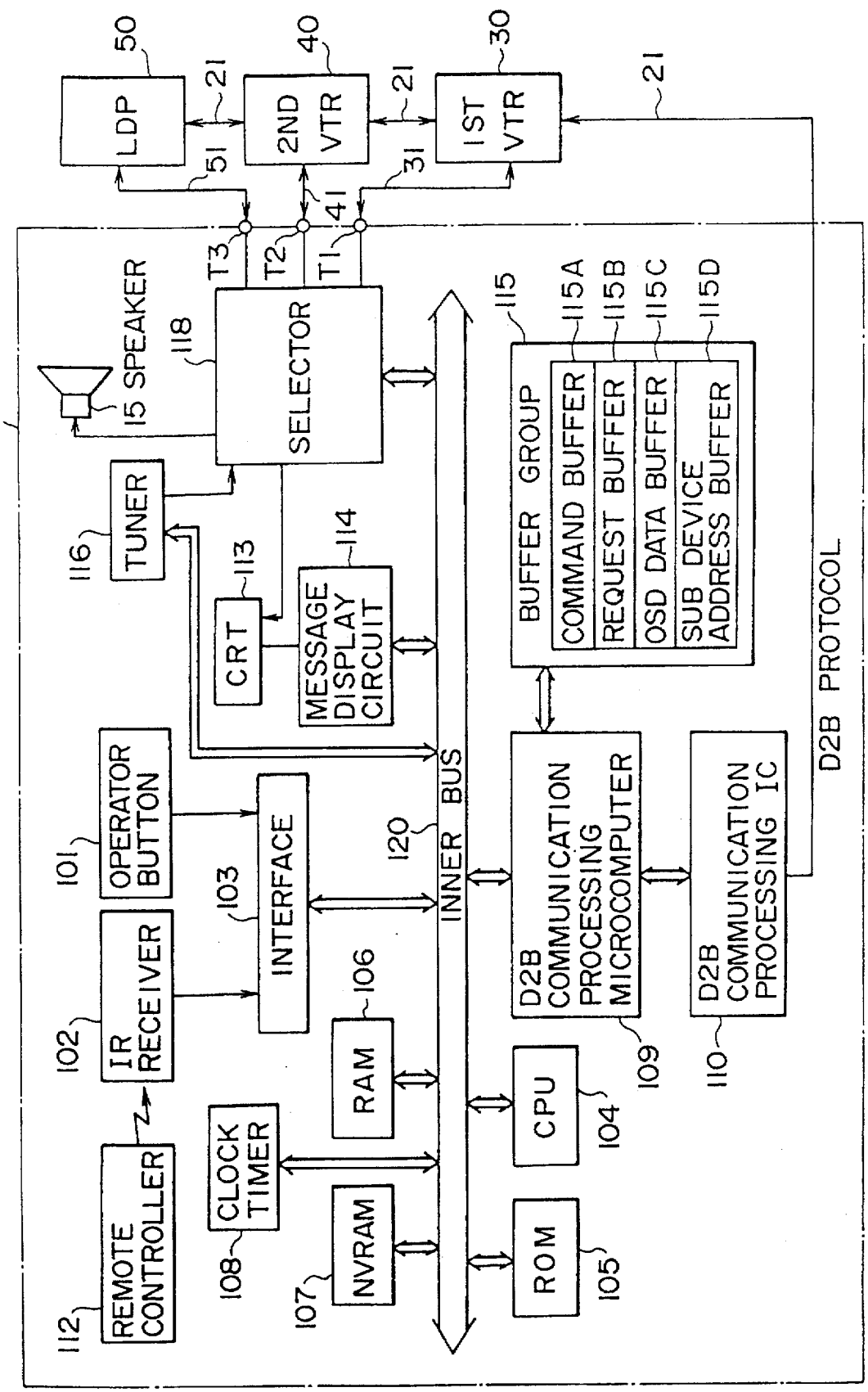
FIG. 3 is a block diagram illustrating a constitution of one preferred embodiment of an unlocking apparatus according to the invention.

Now, referring to FIG. 3, this block diagram shows a constitution of one preferred embodiment of an unlocking apparatus according to this invention. This embodiment is an application of this invention to an AV system. Operating an operator button 101 sends a predetermined command to a CPU 104 via an interface unit 103. Operating a remote controller 112 emits infrared radiation, which is received by an infrared receiver 102. As a result, a predetermined command is sent from the receiver 102 to the CPU 104 via the interface 103.

The CPU 104 processes the received command and issues a channel select instruction to a tuner 116 and sends via an inner bus 120, a command to a D2B communication processing microcomputer 109 which will be described. A ROM 105 stores a program necessary for the CPU 104 to operate. A RAM 106 stores data to be obtained as a result of the processing by the CPU 104. A non-volatile memory 107 stores data which must be retained after the apparatus is powered off. The data includes, for example, a state of connection with other AV apparatuses (a first VTR 30, a second VTR 40, and an LDP 50) for example. A clock timer 108 always performs a clock counting operation, generating timer information.

The CPU 104, the ROM 105, the RAM 106, and the clock timer 108 constitute a main microcomputer for a television.

The D2B communication processing microcomputer 109 is connected to the CPU 104 via the inner bus 120 and connected in series to other AV apparatuses such as the first VTR 30, the second VTR 40, and the LDP 50 via a D2B communication processing IC 110 and a D2B bus or a D2B control line 21 for transferring data and commands.

The D2B communication processing microcomputer 109 is connected to a buffer group 115 to store received data in a corresponding buffer of the group. That is, the microcomputer 109 stores a received command (CMD) in a command buffer 115A, a received request (REQ) in a request buffer 115B, received on-screen-display (OSD) data in an OSD data buffer 115C, and a received sub device address in a sub device buffer 115D. It should be noted that the buffer group 15 can be alternatively implemented by a RAM for the microcomputer 109.

The first VTR 30 is connected to a terminal T1 of a selector 118 via an AV signal line 31 to transfer a video signal and an audio signal with the selector 118. The second VTR 40 is connected to a terminal T2 of the selector 118 via an AV signal line 41 to transfer a video signal and an audio signal with the selector 118. The LDP 50 is connected to a terminal T3 of the selector 118 via an AV signal line 51 to transfer a video signal an an audio signal with the selector 118.

The video signal and the audio signal outputted from the selector 118 are selected by the CPU 104 or the microcomputer 109.

A CRT 113 displays an image indicated by the video signal coming from the selector 118. A message display circuit 114 displays OSD data sent from the D2B communication processing microcomputer 109 via the inner bus 120 in a predetermined area of the CRT 113 as a message. The audio signal coming from the selector 118 is reproduced by a speaker 15.

The operator button 101, the receiver 102, the interface 103, the CPU 104, the ROM 105, the RAM 106, the non-volatile memory 107, the clock timer 108, the D2B communication processing microcomputer 109, the CRT 113, the message display circuit 114, the tuner 116, the selector 118, and the speaker 15 shown in FIG. 3 constitute an AV center or a television 100.

The first VTR 30, the second VTR 40, and the LDP 50 are each provided with a D2B communication processing CPU and a buffer group corresponding to the microcomputer 109 and the buffer group 115 of the AV center 100 for transferring a command, a request, OSD data, and a sub device address via the D2B control line 21.

Before describing an operation of the embodiment of FIG. 8, a configuration of a packet to be transferred via the D2B bus 21 and a mechanism of locking will be described.

FIG. 10 shows the configuration of the above-mentioned packet to be used in the embodiment of FIG. 3. Each packet consists of a source device address, a destination device address, a control bit (CB), an operation code (OPC), and one or more operands. The CB consists of four bits to specify a packet type and a locking or unlocking mode.

Locking and unlocking operations will be described with reference to FIG. 11. An apparatus A consisting of the television 100 for example, an apparatus B consisting of the VTR 30 for example, and an apparatus C consisting of the VTR 40 for example are connected to each other via the D2B bus 21. It should be noted that the apparatuses A, B, and C are each provided with a microcomputer and an IC corresponding to the D2B communication processing microcomputer 109 and the D2B communication processing IC 110 of FIG. 3.

Usually, a command is sent in a plurality of packets. For example, if the apparatus C processes an instruction from the apparatus B while processing an instruction from the apparatus A, management of the internal processing is complicated. Therefore, the apparatus C receives the instruction from the apparatus B after completing the processing of the instruction received from the apparatus A. To be specific, the control bit (CB) of the data packet shown in FIG. 10 is set so that the D2B communication processing IC 110 accepts a command only from a specified apparatus (the apparatus A in the above-mentioned apparatus), or the D2B communication processing IC 110 is put in a locked state. In addition, only the specified apparatus (the apparatus A) can take the IC 110 from the locked state by issuing an unlocking command. That is, only the locking apparatus can unlock the locked apparatus.

However, if no unlocking command comes to the apparatus C from the apparatus A due to an operation error, a timing error or the like, the apparatus C is left locked against any command sent from other apparatuses. To solve this problem, it is so constituted that a locked apparatus sets its locking timer at receiving a locking command, monitors the locking timer, and, if no data has come in a certain period of time, unlocks itself.

Unlike a conventional technique in which a value of the locking timer is monitored in a main routine and, if no data has been received within a certain period of time, a locking flag is cleared, the embodiment according to this invention determines a value of the locking timer in an interrupt timer routine and, when the value has exceeded a predetermined value, clears the locking flag to unlock a locked slave apparatus.

Figure 4:
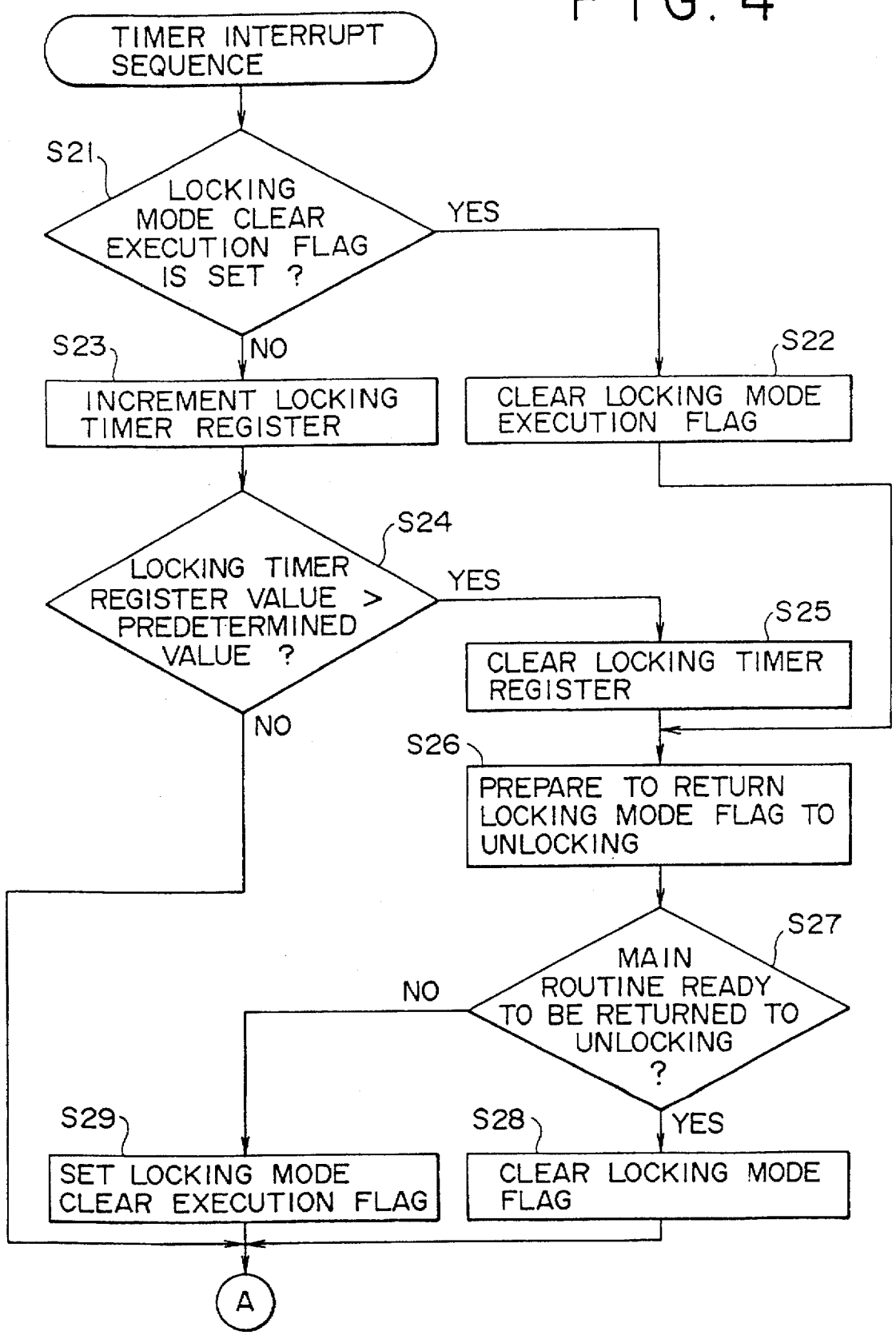
FIG. 4 is a flowchart describing a portion of an example of a timer interrupt operation of the embodiment shown in FIG. 3.
Figure 5:
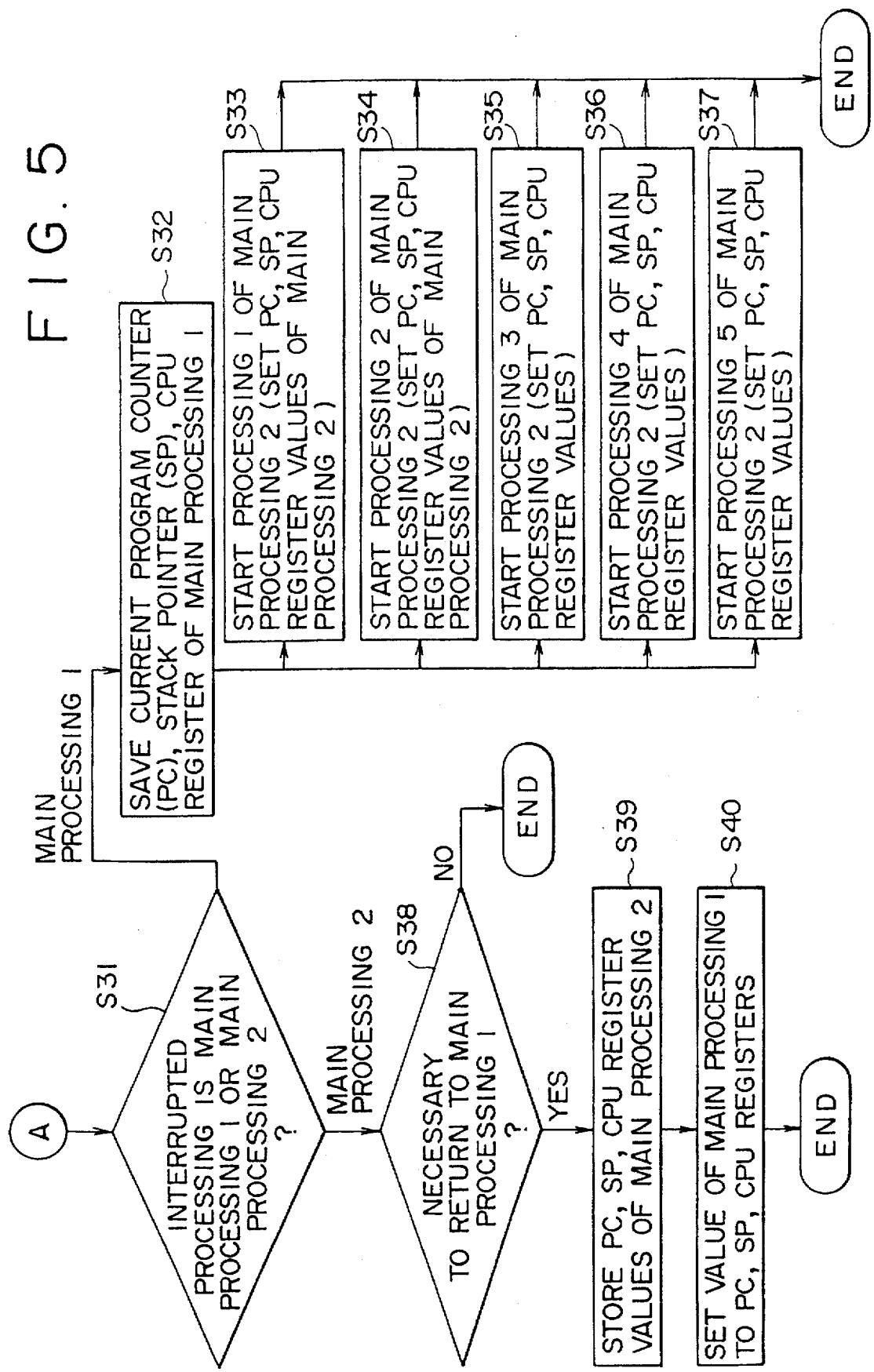
FIG. 5 is a flowchart describing a remaining portion of the example of the timer interrupt operation of the embodiment shown in FIG. 3.

FIGS. 4 and 5 show an example of a timer interrupt in the embodiment of FIG. 3. First, the D2B communication processing microcomputer 109 clears a locking mode clear execution flag (step S22) if it is set (YES of step S21) and make a preparation for returning the locking mode flag to an unlocked state (step S26).

If the locking mode clear execution flag is not set (NO of step 21), the D2B communication processing microcomputer 109 increments a locking timer register by one (step S23) and, when a value of the locking timer register has exceeded a predetermined value (YES of step S24), clears the locking timer register (step S25) to make a preparation for returning the locking mode flag to the unlocked state (step S26).

When the preparation for returning the locking mode flag to the unlocked state has been complete (step S26), the D2B communication processing microcomputer 109 determines whether main routine processing can be currently returned to the unlocked state (step S27) and, if it can be returned to the unlocked state, clears the locking mode flag (step S28); otherwise, the microcomputer sets the locking mode clear execution flag (step S29).

The D2B communication processing microcomputer 109 determines whether the interrupted processing is main processing 1 or main processing 2 (step S31) when the locking timer register has not exceeded the predetermined value (NO of step S24), the locking mode flag has been cleared (step S28) or the locking mode clear execution flag has been set (step S29).

If the interrupted processing is the main processing 1, the D2B communication processing microcomputer 109 saves current values of a program counter (PC) (step S32), a stack pointer (SP) and a CPU register of the main processing 1 and sets values of the PC, SP and CPU register of the main processing 2 to start processing 1, 2, 3, 4 or 5 of the main processing 2 (step S33, S34, S35, S36 or S37).

If the interrupted processing is the main processing 2, the D2B communication processing microcomputer 109 determines whether it is necessary to return to the main processing 1 (step S38). It it is necessary, the microcomputer 109 stores the values of the PC, the SP and the CPU register of the main processing 2 (step S39) and sets the values of the main processing 1 to the PC, the SP and the CPU register (step S40).

Figure 6:
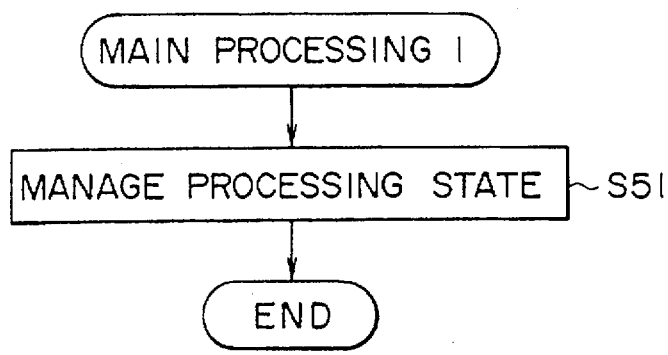
FIG. 6 is a flowchart describing an example of main processing 1 of the embodiment shown in FIG. 3.

FIG. 6 indicates an example of the main processing 1 in the embodiment of FIG. 3. As shown in the figure, the main processing 1 performs processing state management.

Figure 7:
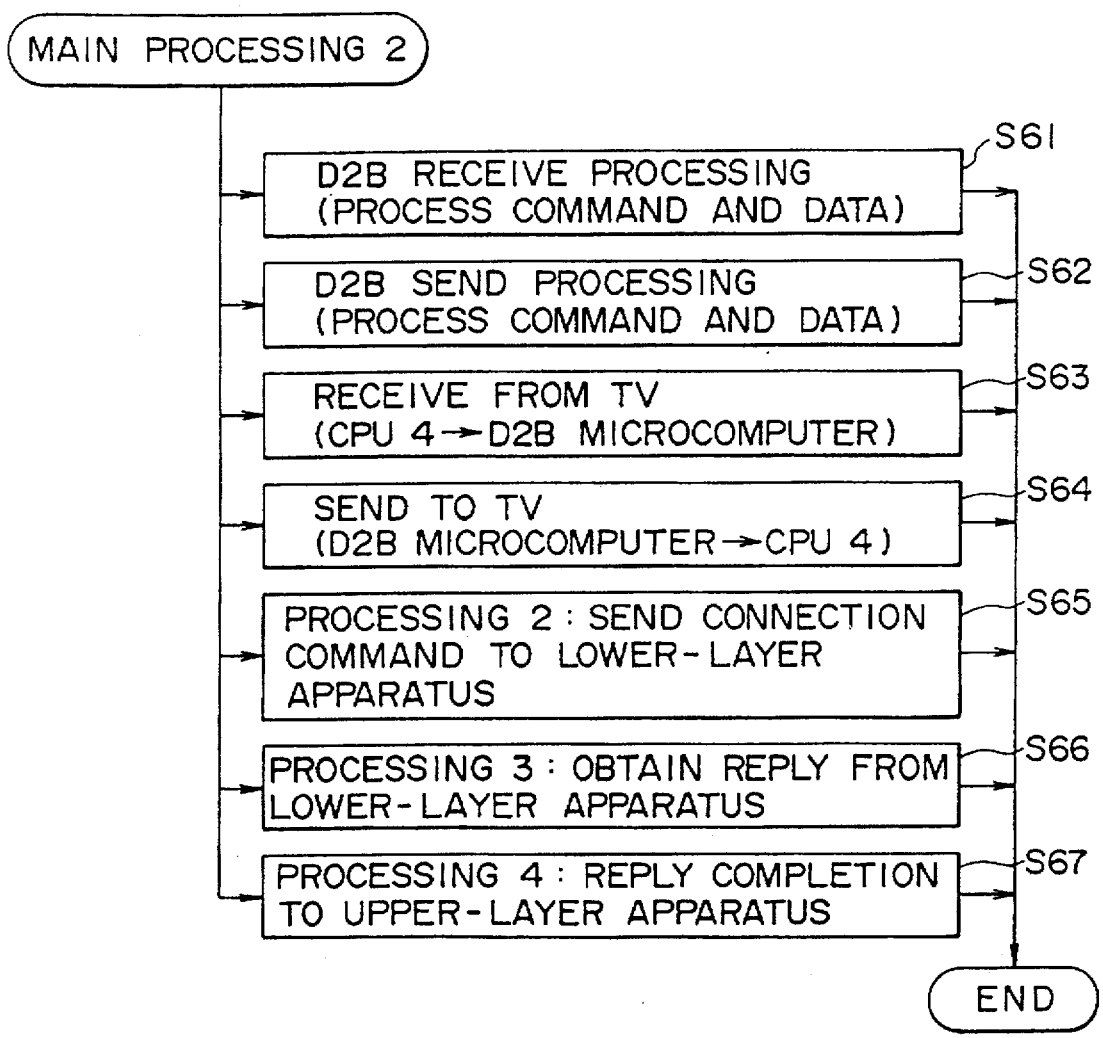
FIG. 7 is a flowchart describing an example of main processing 2 of the embodiment shown in FIG. 3.

FIG. 7 shows an example of the main processing 2 in the embodiment of FIG. 3. The main processing 2 includes D2B receive processing (step S61), D2B send processing (step S62), processing for receiving from the TV CPU 104 by the D2B communication processing microcomputer 109 (step S63), processing for sending to the TV CPU 104 by the microcomputer 109 (step S64), processing for sending a connection command to a lower-layer apparatus, or the processing of FIG. 5 (step S65), processing for obtaining a reply from a lower-layer apparatus, or the processing 3 of FIG. 5 (step S66), and processing for sending a reply of completed connection to an upper-layer apparatus, or the processing 4 of FIG. 5 (step S67). One of these processing operations is performed according to an interrupted timing.

Usually, the main processing 1 and the main processing 2 are processed on a time-sharing basis in units of 50% each. However, if one of them is in a wait state, the other is assigned with all time except for a timer interrupt time As described by referring to FIGS. 6 and 7, the main processing 1 executes the main routine while the main processing 2 selectively executes subroutines. That is, it is so constituted that, with states of timer processing operations and states of input/output devices (peripheral integrated circuits) monitored at the same time, the main processing 1 (the processing of an entire framework) dedicates itself to the execution of the main routine without being engaged in the monitoring processing and the main routine 2 dedicates itself to the execution of its own processing modules. This results in a simplified program module and separate program development and debugging, shortening an overall development time.

Figure 8:
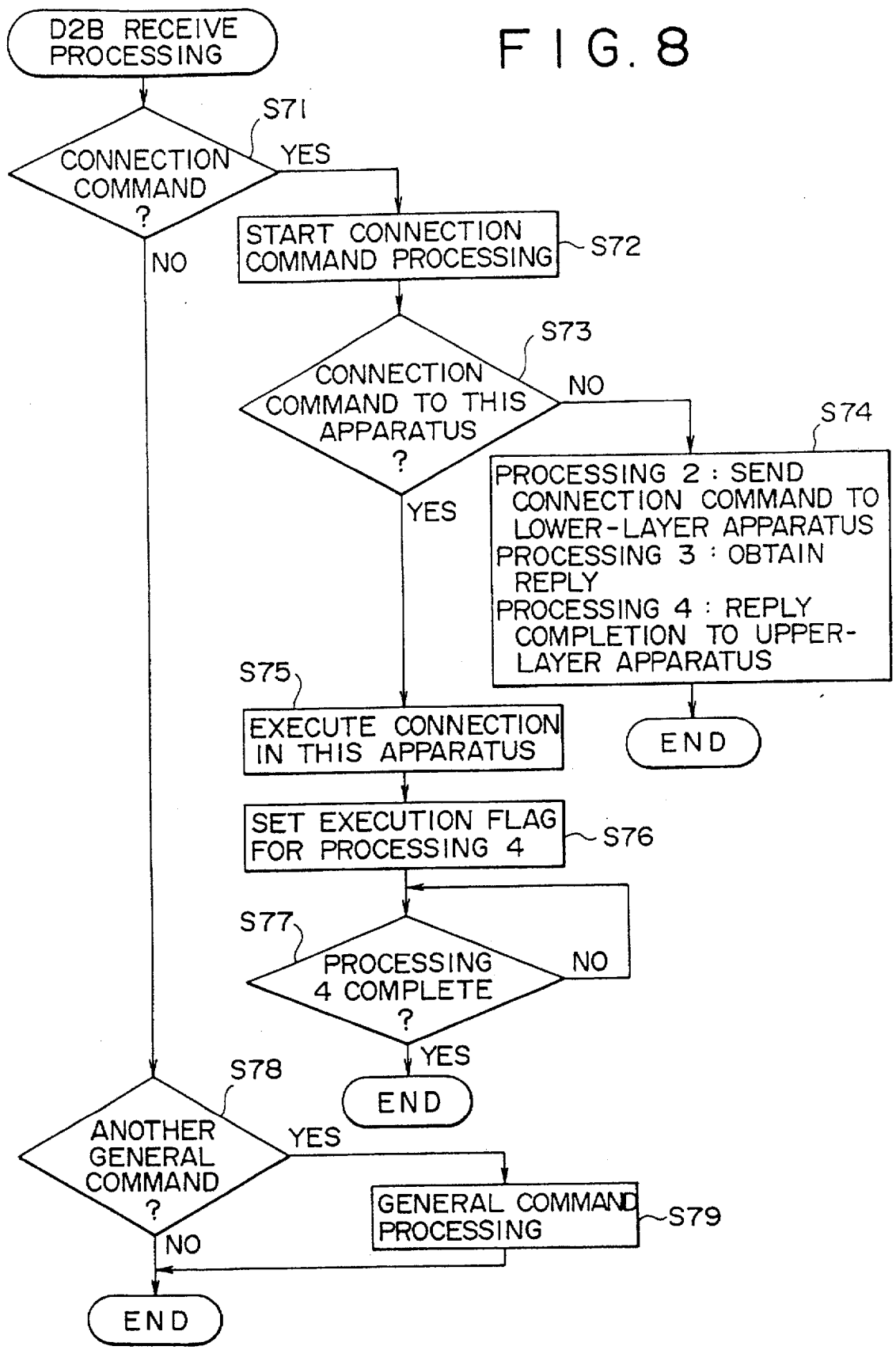
FIG. 8 is a flowchart describing an example of D2B receive processing of the embodiment shown in FIG. 3.

FIG. 8 shows an example of the D2B receive processing in the embodiment of FIG. 3. First, the D2B communication processing microcomputer 109 determines whether received data is a connection command (step S71). If it is a connection command, the microcomputer 109 starts connection command processing (step 872) and determines whether the connection command is for connection to this apparatus (step S73). If the command is not connection to this apparatus, the microcomputer 109 sends the connection command to a lower-layer apparatus, obtains a reply from it, and sends a reply to an upper-layer apparatus indicating the completion of the connection processing (step S74).

If the connection command is for connection to this apparatus, the microcomputer 109 performs connection processing in this apparatus (step S75) and sets a flag for executing the process of sending a reply to an upper-layer apparatus indicating the completion of connection processing. When the microcomputer 109 has completed the above-mentioned processing of sending a replay to an upper-layer apparatus (YES of step S77), the receive processing terminates.

The D2B communication processing microcomputer 109 determines whether the received data determined in step S71 to be a command other than a connection command is a general command (step S78). If the received data is a general command, the microcomputer 109 performs general command processing (step S79).

FIG. 9 shows an example of received data interrupt processing in the embodiment of FIG. 3. The D2B communication processing microcomputer 109 checks the control bits of a received data packet if received data is a command, a request, OSD data, or a sub device address. The microcomputer 109 stores the result in a buffer 115A, 115B, 115C or 115D accordingly.

The power controlling apparatus according to this invention turns off a power to an apparatus whose connection to a central apparatus has been cut by a connection change, thus selectively turning off a power to an apparatus not required by the central apparatus.

The unlocking apparatus according to this invention determines a value of the locking timer in the interrupt timer routine and, when the value has exceeded a predetermined level, takes a slave apparatus out of the locked state, thereby simplifying programming.

While the preferred embodiments of the invention have been described using specific terms, such description is fop illustrative purpose only, and it is to be understood that changes and variations may be made without departing from the spirit or scope of the appended claims.

What is claimed is:

1. A power control system comprising:

a master apparatus;

a plurality of slave apparatus units controlled by the master apparatus, a first of the slave apparatus units being connected to the master apparatus;

control means connected to the master apparatus for receiving from a user of the power control system a connection command for connecting a second of the slave apparatus units to the master apparatus and outputting a control signal; and a central processing unit connected to the control means for disconnecting the first slave apparatus unit from the master apparatus and connecting the second slave apparatus unit to the master apparatus in response to the control signal and for supplying the first slave apparatus unit with a power off signal to turn off power to the first slave apparatus unit after the first slave apparatus has been disconnected from the master apparatus and after a predetermined non-zero finite period of time has passed, wherein the central processing unit verifies whether the control signal corresponds to the first slave apparatus unit that is already connected to the master apparatus or another slave apparatus unit before disconnecting the first slave apparatus unit from the master apparatus.

2. A method for controlling power to a plurality of slave apparatus units controlled by a master apparatus, comprising the steps of:

receiving a connection command corresponding to a user selection of a first slave apparatus unit;

verifying whether the first slave apparatus unit is already connected to the master apparatus;

disconnecting a second slave apparatus unit from the master apparatus in response to the connection command;

connecting the first slave apparatus unit to the master apparatus in response to the connection command; and supplying the second slave apparatus unit with a power off signal from a control apparatus connected to the master apparatus after the second slave apparatus has been disconnected from the master apparatus and after a predetermined non-zero finite period of time to turn off power to the second slave apparatus unit.

\* \* \* \* \*